Patented May 10, 1927.

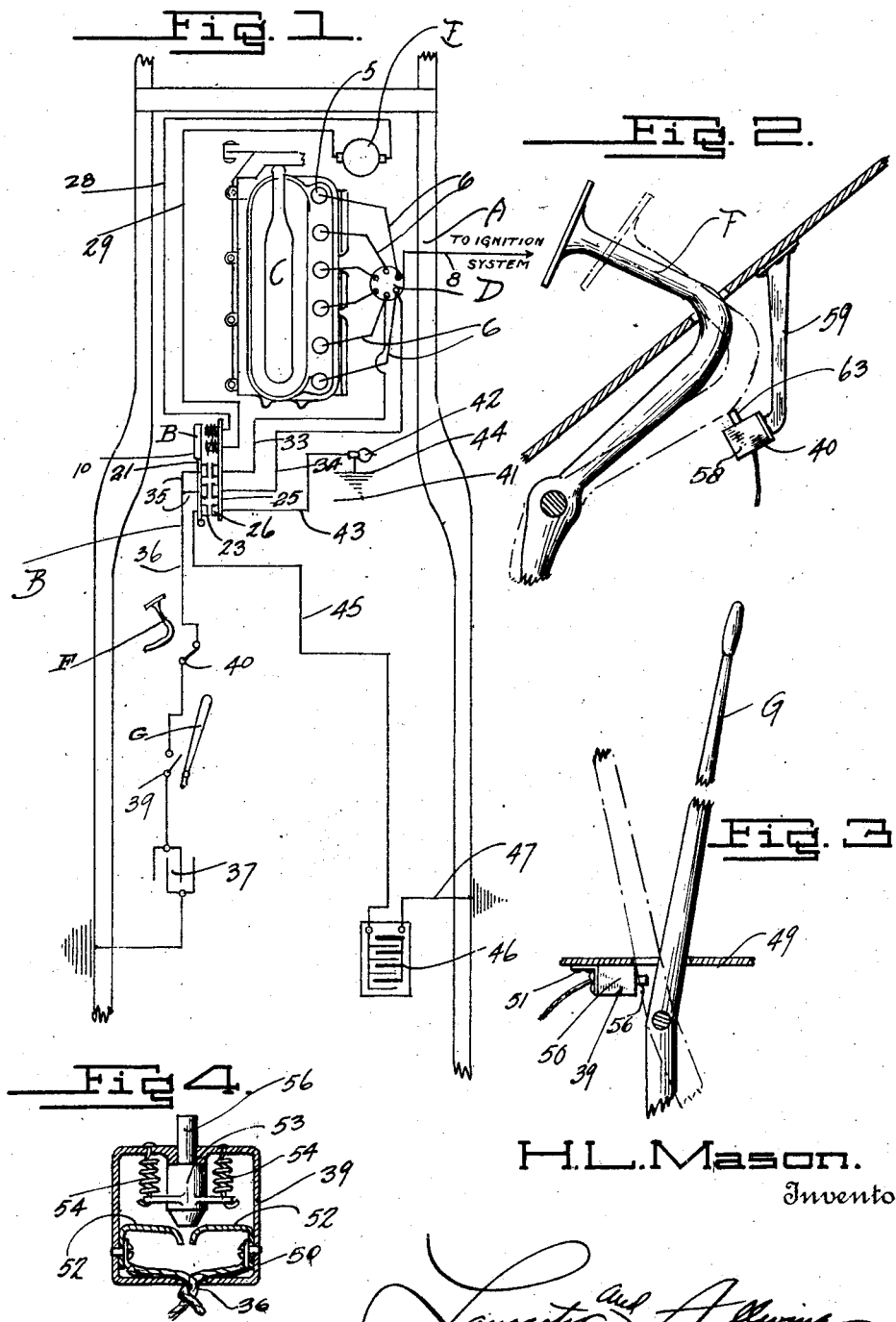

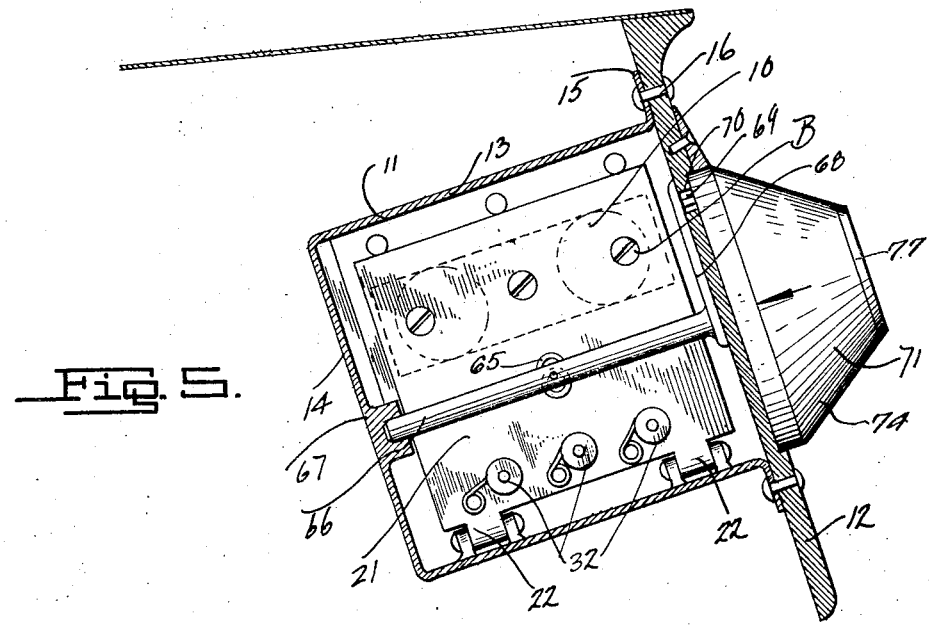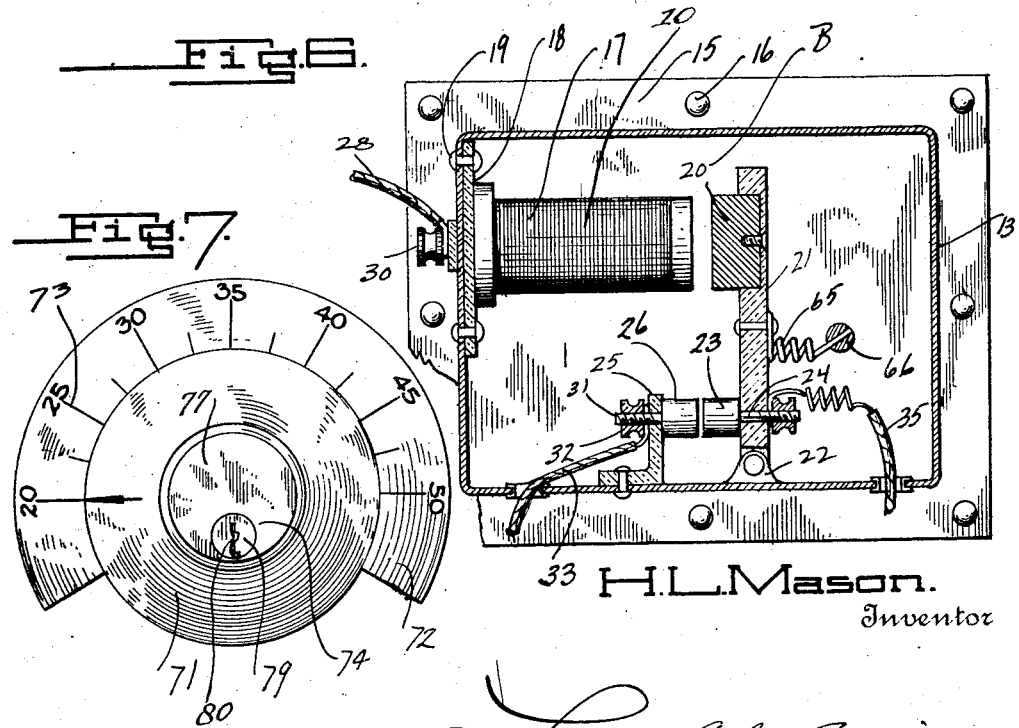

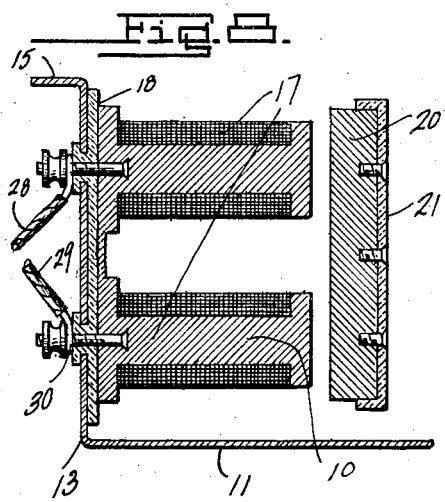
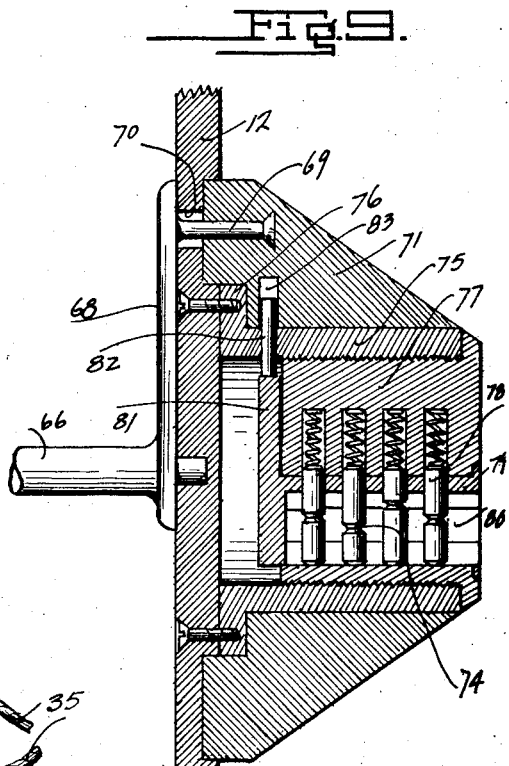
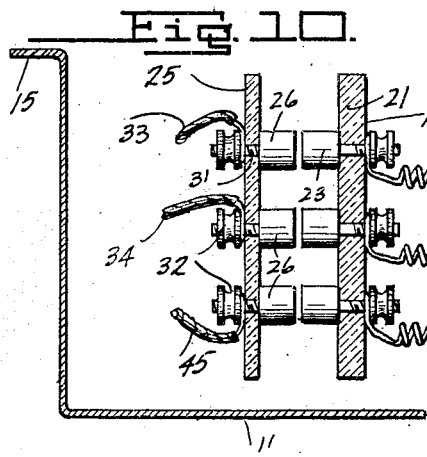
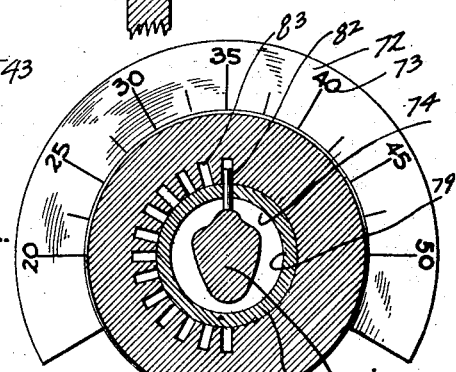

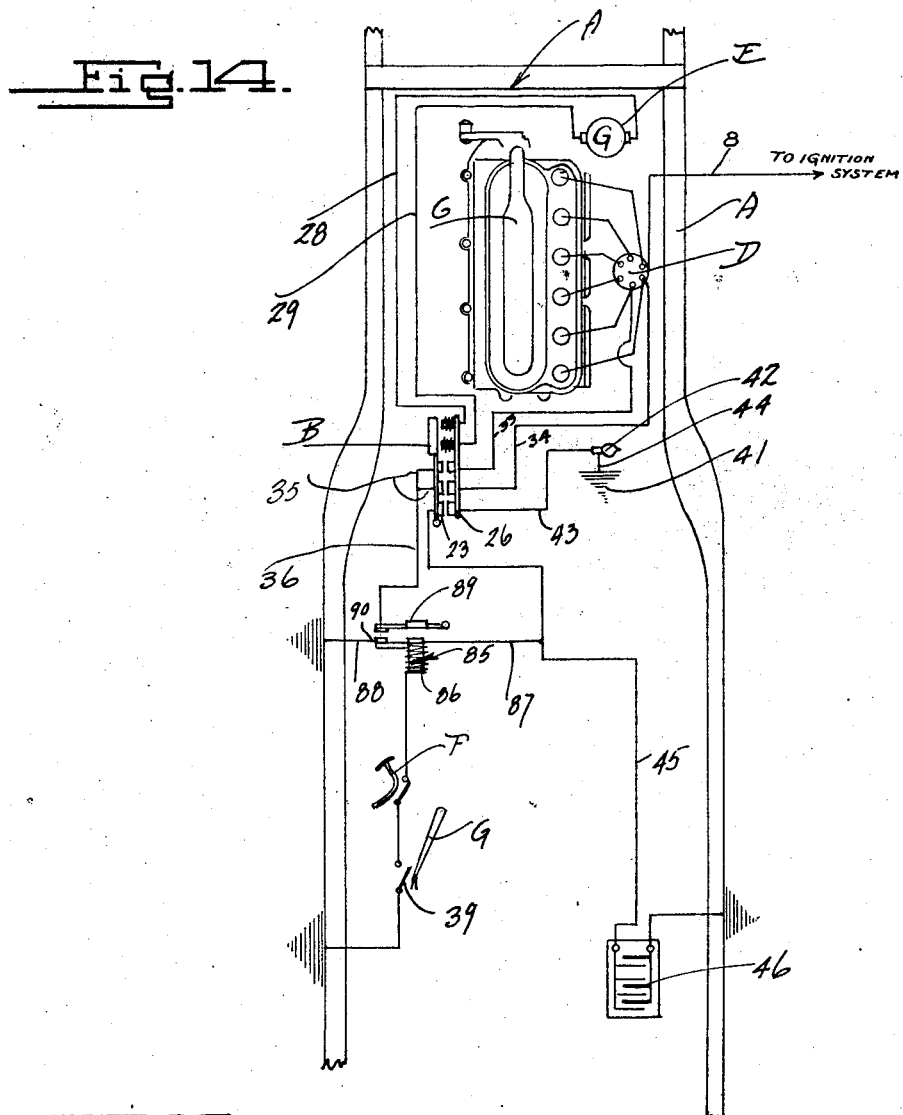
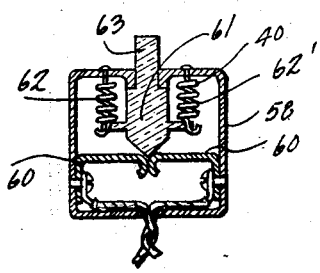

1,627,985

UNITED STATES PATENT OFFICE.

HENRY L. MASON, OF ASHEVILLE, NORTH CAROLINA.

ELECTRIC SPEED CONTROL FOR MOTOR VEHICLES.

Application filed March 29, 1920. Serial No. 369,681.

This invention relates to speed controlling devices for motor vehicles, and the primary object of the invention is to provide an automatic means for preventing the operation of the engine, when the speed of the vehicle exceeds a certain limit, thereby preventing excessive speeding of the vehicle, and thus eliminating accidents caused thereby.

Another object of the invention is to provide an improved electrical speed control for motor vehicles, which is so constructed that the owner of the vehicle can adjust and lock the means and thereby absolutely prevent the vehicle from exceeding a desired speed limit, thereby insuring safety for the vehicle within certain limits, when lending the same to other persons, the device also being adapted for providing means whereby drivers of public vehicles, such as taxicabs and the like cannot race with their vehicles.

A further object of the invention is to provide an improved means for automatically controlling the speed of motor vehicles in which the means can be adjusted to any desired speed limit so that the vehicle cannot exceed the desired speed, the device having an improved means for locking the adjustable means so as to prevent tampering therewith by unauthorized persons.

A further object of the invention is to provide electrical speed control for motor vehicles in which the current to a certain number of the spark plugs of the engine is diverted when the vehicle speed exceeds a predetermined speed thereby providing means for effectively decreasing the speed of the vehicle.

A further object of the invention is to provide an improved means for operating a relay when the output of the generator for a motor vehicle exceeds a certain point, the relay acting to close the contact to divert the flow of current from a certain number of the spark plugs, thus preventing the vehicle from exceeding a predetermined speed, means also being provided for adjusting the relay so that a certain amount of current will be necessary to operate the same.

A further object of the invention is to provide means for permitting the engine to be accelerated above its connected driving speed when the clutch is thrown out which is often desirable and necessary at certain times and under certain conditions.

A still further object of the invention is to provide an improved means for adjusting the relay so as to permit various strengths of currents generated by a generator to actuate the relay when desired, the adjusting means having a locking device to prevent operation thereof by unauthorized persons.

A further object of the invention is to provide an improved means for indicating when the relay is in operative or inoperative position.

A still further object of the invention is to provide an improved electrically controlled device for motor vehicles, of the above character, which is durable and efficient in use, and one that can be incorporated with the ignition systems of motor vehicles now on the market as well as with vehicles in the course of manufacture.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a diagrammatic view of the improved device showing the same applied to the chassis of a pleasure or commercial car.

Figure 2 is an enlarged fragmentary vertical section through a motor vehicle illustrating a switch carried by the foot boards and arranged adjacent to the clutch pedal and adapted to be operated by the clutch pedal when the clutch is moved to its inoperative position.

Figure 3 is an enlarged detail vertical section through a motor vehicle illustrating a switch connected thereto and adapted to be operated by the gear shift lever when the lever is moved to its high speed position.

Figure 4 is an enlarged detail section through the switch adapted to be operated by the gear shift lever.

Figure 5 is an enlarged vertical longitudinal section through the casing containing the relay and adjusting means therefor.

Figure 6 is a transverse section through the same.

Figure 7 is a detail front elevation of the adjusting means for the relay and lock therefor.

Figure 8 is a detail vertical section through the relay.

Figure 9 is an enlarged vertical section through the lock for the adjusting means for the relay.

Figure 10 is a fragmentary detail section through the casing carrying the relay illustrating the circuit closing means actuated by the relay.

Figure 11 is a detail transverse section through the lock for the adjusting means for the relay.

Figure 12 is a fragmentary vertical section through the dash or other support for the lock and relay illustrating slot therein for the reception of the adjusting lever for the relay.

Figure 13 is a detail section through the switch or circuit breaking means operated by the clutch pedal.

Figure 14 is a diagrammatic view illustrating a further modified form of the invention applied to a vehicle chassis.

Referring to the drawings in detail, wherein similar reference characters designate corresponding parts throughout the several views, the letter A indicates a motor vehicle chassis, which is provided with the improved automatic speed control device B. The chassis A may be of any preferred type and has associated therewith the internal combustion engine C which as shown consists of a six cylinder engine, but it is to be understood that any engine having any number of cylinders may be used. Each of the cylinders is provided with an ordinary spark plug 5, which has one electrode grounded to the engine block in the ordinary manner, and the other electrode connected by wires 6 to the distributor D which may be of the ordinary or any preferred type. The distributor D is connected in the ordinary manner by means of a wire 8 with the ignition circuit of the vehicle. A generator or dynamo E may be provided, which is supported in any approved manner by the vehicle and is preferably operated by the internal combustion engine C thereof so that the output in voltage is in direct proportion to the speed at which it is driven by the engine C. The chassis A is further provided with the ordinary clutch pedal F and gear shift lever G, which will be hereinafter more fully referred to.

The improved automatic speed control means B for the vehicle includes a relay 10 which is introduced in the line circuit of the generator or dynamo E. The relay 10 may be of any preferred type such as a combination series and shunt wound, but it is preferred and shown that a two coil series type be used. The relay 10 is mounted in a casing 11, which as shown is secured to the back of the instrument board 12 of the body of the vehicle. The casing 11 is of substantially box like configuration formed of sheet metal or the like and prevents unauthorized persons from tampering with the relay. The casing 11 includes the side walls 13, and the bottom wall 14. The side walls are provided with outwardly extending flanges 15, which are riveted or otherwise secured to the instrument board 12 in any preferred manner as indicated at 16. The relay 10 includes a pair of electromagnets 17 connected together in the ordinary manner and mounted upon an insulating plate 18, which is bolted or riveted as at 19 to one side wall 13 of the casing. The electromagnetic coils 17 are adapted to attract an armature 20 which is carried by a plate 21 formed of insulating material. This plate is connected by suitable hinges 22 at its lower end to one of the walls of the casing 11. The relay is mounted on the car in such a manner that the same will be set at right angles to the travel thereof so that the plate 21 will not be swung on its hinges by the movement of the car. The insulating hinged plate 21 is provided with three spaced contacts 23 which are connected to the plate by means of threaded shanks 24, which have threaded on the same suitable lock nuts. The shanks 24 and nuts also form binding posts for a purpose which will hereinafter more fully appear. The casing 11 has mounted therein directly in front of the hinged plate 21, an angle plate 25 preferably formed of insulating material such as fiber, hard rubber, porcelain or the like, and this plate has connected thereto three spaced contacts 26 which are arranged in direct alignment with the contacts 23 and the same are adapted to be engaged by the contacts 23 when the armature 20 is attracted by the electromagnetic coils 17. The electromagnetic coils 17 are electrically connected to the generator or dynamo E by means of wires 28 and 29, which are connected to the binding posts 30 carried by the coils. The contacts 26 are held in position on the angle plate 25 by means of shanks 31 carried by the contacts, which are positioned through the plate and these shanks are engaged by nuts 32. The shanks and nuts 31 and 32 also form binding posts. Two of the contacts 26 have electric wires 33 and 34 connected thereto which lead to two of the contact points of the distributor D for a pair of the spark plugs of the engine. The contacts 23 which are in direct alignment with the contacts 26 having the wires 33 and 34 electrically connected thereto, have branch wires 35 connected therewith which are grounded by means of a wire 36 to the vehicle chassis frame. Thus it will be seen that when the mentioned contacts 23 and 26 are in abutting relation. the current for two of the spark plugs will be diverted therefrom and will take the following course:

from the line wire 8 through the distributor and the wires 33 and 34, through the contacts 26 and 23, through the wire 36 to the frame and back to the ignition system. A suitable impedance unit such as a condenser 37 is interposed in the line wire 36. This condenser is sufficiently low in reactance to impede partially or totally the current supply through the spark plugs of the two cylinders. The wire 36 has also interposed therein switches 39 and 40 which will be hereinafter more fully described. The other of the contacts 26 and 23 form the visual indicating means 41 which as shown consists of a small electric lamp 42 which is mounted on the instrument board or other convenient portion of the body of the motor vehicle. The lamp 42 has one contact thereof connected by means of wire 43 to the contact 26 and its opposite end is grounded to the frame as at 44. The remaining contact 23 has a wire 45 connected thereto, which leads to one terminal of a battery 46. The opposite terminal of the battery 46 is grounded to the vehicle frame, as at 47. This battery 46 may be the usual storage battery used in the ignition system of motor vehicles. Thus it will be seen that when the electro-armature 20 is in contact with the electromagnetic coils 17 the circuit to the lamp 42 will be closed thereby indicating that the current through certain of the spark plugs of the engine has been diverted therefrom.

The switch or circuit closer 39 is so arranged that the circuit through the wire 36 is normally opened and is adapted to be only actuated when the gear shift lever G is moved to position for throwing the high speed gear in operation. The gear shift lever G operates in the ordinary or any preferred manner through a slot or slots in the floor board 49 of the vehicle and the switch or circuit closer 39 includes a casing 50 which is bolted or otherwise secured as at 51 to the lower surface of the floor board directly in rear of the lever and when the same is moved to a high speed position, the switch will be actuated. The casing 50 has mounted therein the two spaced spring contacts 52 which have connected thereto the portions of the wire 36. The contacts 52 are adapted to be bridged by a bridging member 53 which is normally held away from the contacts 52 by means of contractile coil springs 54. The bridge member 53 is provided with a stem 56, which slidably extends through one wall of the casing 50 and is adapted to be engaged by the lever G when the same is moved to its high speed position. Thus it will be seen that when the lever G is thrown to its high speed position and the generator E generates sufficient current so as to energize the magnetic coils 17 so that the same will attract the armature 20, the spark plugs which have the wires 33 and 34 connected to their contact points of the distributor will be cut out.

The switch 40 is provided so as to permit the engine to be accelerated above its connected driving speed, while the gear switch lever is in high, as shown in dotted outlines in Figure 3, which is sometimes desirable. This switch 40 is under the control of the clutch pedal F, and it is obvious that when the switch is operated the relay circuit will be opened and thus permit the engine to operate in the usual manner. The clutch pedal F is mounted in the ordinary manner and protrudes through a slot in the floor board and the switch or circuit breaker 40 includes a casing 58 which is bolted to a depending bracket 59, which is secured to the under surface of the floor of the motor vehicle. The bracket 59 holds the switch or circuit breaker in correct position so that when the pedal is moved to disconnect the transmission mechanism with the internal combustion engine C the switch or circuit breaker will be operated so as to open the circuit in the wire 36. The switch or circuit breaker is arranged so that the circuit will be normally closed through the wire 36. The switch or circuit breaker 40 includes the casing 58 which has mounted therein the spring contacts 60 which are normally in engagement with each other and are adapted to be forced apart so as to open the circuit by means of an insulating wedge shaped member 61 which is normally held in a raised position by contractile springs 62'. The wedge shaped insulating member 61 is provided with a plunger 63 which is slidably mounted through one wall of the casing and this plunger is positioned in direct alignment with the pedal F. Thus it will be seen that when the pedal is moved to disconnect the internal combustion engine with the transmission mechanism, the contacts 60 will be moved out of engagement with each other.

A coil spring 65 is connected at one end to the hinged plate 21 and at its opposite end to a rotatable shaft 66. By rotating the shaft 66 the tension of the spring 65 can be regulated. By regulating the tension of the spring it can be seen that more or less current will be necessary according to the tension of the spring to attract the armature 20 and swing the plate 21 on its hinges. This means of adjusting the spring 65 permits the owner of the machine to regulate the speed at which the spark plugs will be thrown out of operation. The shaft 66 is mounted in a suitable bearing 67, carried by the lower wall 14 of the casing 11. The opposite end of the shaft 66 has secured thereto the outwardly extending arm 68, the outer terminal of which carries a lug 69 which is slidably mounted in the arcuate slot 70 formed in the instrument board 12. The lug 69 is connected to the rotatable indicator ring 71, which will be hereinafter more fully described. Arranged around the movable indicating plate 71 is an arcuate dial plate 72 which has marked thereon suitable indications 73, by means of which the operator can tell at just the tension the spring is to be adjusted to permit the armature to be actuated by the electromagnetic coils 17, when the vehicle reaches a certain speed. To prevent the shaft 66 being actuated by unauthorized persons a pin and cylinder lock 74 is provided for the shaft. The lock 74 includes the cylindrical body 75, which is provided with an annular flange 76 which is secured to the instrument board 12 in any preferred manner. The hollow cylindrical member 75 has mounted on the same for rotary movement, the ring 71 which has connected thereto the lug 69 which is slidably mounted in the arcuate slot 70. The cylinder 75 has mounted therein the body 77 which carries a plurality of spring pressed pin couplers 78, which are adapted to engage in suitable openings formed in the rotating cylinder 79. It can be seen that when the correct key is inserted in the keyway 80 formed in the cylinder 79, the pin tumblers will be actuated to permit the cylinders 79 to be rotated. The cylinder 79 has formed on the rear end thereof a cam 81, which is adapted to normally hold a sliding pin 82 in any one of the openings 83 which correspond to the indications 73 formed on the arcuate plate 72.

All wires leading to and from relays and other appliances are to be enclosed in steel conduits, with couplings securely fastened as a protection from intruders.

In operation of the improved device, the owner of the vehicle operates the lock so as to permit the ring 71 to be rotated to the desired point indicating the speed at which the owner of the vehicle does not desire the vehicle to exceed. When the ring is set at the desired point the lock is locked in the ordinary manner. The vehicle is then started as usual and when the shift lever is moved to high speed position the switch 39 will be actuated so as to close the circuit through the wire 36. When the speed of the engine reaches a point where the vehicle is being driven at the desired speed the generator E will be generating sufficient current to overcome the tension of the spring 65 and attract the armature 20 and thus bring the contacts 23 and 26 into abutting relation to each other which will divert the flow of current from certain of the spark plugs in certain of the cylinders of the engine and thus effectively decrease the speed of the engine, and light the lamp 42. Thus it can be seen that the speed of the vehicle can be readily regulated.

In Figure 14 is shown a slightly modified form of the invention in which a relay mechanism 85 is also interposed in the wire 36 and this relay mechanism has connected to the electric coil 86 thereof, a wire 87, which is connected to the wire 45 of the storage battery 46. The other terminal of the electromagnetic coil is grounded to the vehicle frame by means of a wire 88. The relay 85 also includes a pivoted armature 89 which is adapted to close spaced contacts 90 when the same is attracted by the magnetic coil 86. It can be seen that as soon as the gear shift lever G is moved to its high position the current through the electromagnetic coil 86 will be closed thus energizing the same and attracting the armature 89, thus permitting the operation of the device as described for the form shown in Figures 1 to 13.

While the simplest means of regulating the speed would be to use but a single line from only one spark plug contact of the timer to the device B, yet more than one spark plug may be short circuited as illustrated in Figure 1 of the drawings, without liability of premature firing of the engine at any time, by the judicious selection of cylinders, and which can be arranged by one skilled in the firing order of the engine.

Changes in details may be made without departing from the spirit or scope of my invention; but,

I claim:

1. In an electric control device for motor vehicles, an internal combustion engine, a source of electrical energy, ignition devices for the cylinders of the engine, a gear shift lever, means for diverting the flow of current to certain of the ignition devices when the engine exceeds a certain speed when the gear shift lever is in normal running position, a clutch pedal, and means operated by the clutch pedal for permitting the operation of all of the ignition devices when the gear shift lever is in high position.

2. In an electric speed control device for motor vehicles, an internal combustion engine, a source of electrical energy, ignition devices for the cylinders of the engine, a gear shift lever, means for diverting the flow of current to certain of the ignition devices, when the engine exceeds a certain speed and when the gear shift lever is in high position, and means for permitting the operation of all of the ignition devices when the clutch pedal is in position for disconnecting the transmission mechanism from the engine.

3. In an electric speed control device for motor vehicles, an internal combustion engine, a source of electrical energy, ignition devices for the cylinders of the engine, a gear shift lever, a transmission mechanism, a clutch pedal, means for diverting the flow of current to certain of the ignition devices when the gear shift lever is in high position, and a circuit breaker operated by said clutch pedal to permit the operation of all of the ignition devices when the clutch pedal is operated to disconnect the transmission mechanism from the engine.

4. In an electric speed control device for motor vehicles, an internal combustion engine, an engine operated generator, ignition devices for the cylinders of the engine, a circuit connected to certain of the ignition devices arranged to divert the flow of current therefrom, a normally open electromagnetic switch interposed in the circuit, means for closing the switch when the output of the generator exceeds a certain voltage, a second switch interposed in the circuit, a gear shift lever, and means for actuating the second switch by said gear shift lever when the same is moved to high speed position.

5. In an electric speed control device for motor vehicles, an internal combustion engine including an ignition system, a generator, means operatively connecting the generator with the internal combustion engine, an electric circuit for diverting partial flow of current of the ignition system from the engine, a relay interposed in the circuit including electromagnets, and a pivoted armature, means carried by the armature for closing the circuit when in engagement with the magnets, means for energizing the magnets from the generator, a tension spring connected to said armature, and means for regulating the tension of said spring.

6. In an electric speed control for motor vehicles, an internal combustion engine, spark plugs for the cylinders thereof, a generator, an ignition system for said spark plugs, an electric circuit arranged to divert the flow of current from certain of the spark plugs, a relay interposed in the circuit including a pair of electromagnets, and a hinged armature, the armature being arranged to close the circuit when the same is in abutting relation with the electric magnets, means for energizing the electromagnets from said generator, a tension spring connected to the armature, a shaft for tensioning the springs, and means for locking the shaft against movement.

7. In a speed control device for motor vehicles, an internal combustion engine, a generator, spark plugs for the cylinders of the engine, means electrically connecting the generator to the engine, a circuit arranged to divert the flow of current from certain of the spark plugs, an electric light indicating circuit, a relay interposed in the circuits including a pair of electromagnets and a pivoted armature, means actuated by the armature when the same is in abutting relation with the electromagnets for closing the circuits, means energizing the magnets from the generator, a normally open switch interposed in a circuit for diverting the flow of current from certain of the spark plugs, a gear shift lever, and means operated by the gear shift lever for closing the normally open switch when the gear shift lever is moved to its high point position.

8. In a speed control device for motor vehicles, an internal combustion engine, a generator, an ignition system including ignition devices for the cylinders of the engine, and a distributor, an electric circuit connected with the distributor and arranged to divert the flow of current to certain of the ignition devices, a relay interposed in the circuit including an electromagnet connected with said generator, a pivoted armature, and means operated by the armature for closing the circuit when the armature is in abutting relation to the electromagnet.

9. In a speed control device for motor vehicles, an internal combustion engine, a generator, means connecting the generator with the engine, an ignition system including ignition devices for the cylinders of the engine, an electric circuit arranged to divert the flow of current from certain of the ignition devices, a relay interposed in the circuit including electromagnets, a pivoted armature, means actuated by the armature for closing the circuit when the armature is in engagement with the electromagnets, means for energizing the electromagnets from the generator, a tension spring connected to the armature, a rotatable shaft connected to the spring arranged to regulate the tension thereof, a dial plate, an indicator carried by the shaft arranged to cooperate with the dial plate, and means for locking the shaft against movement.

10. In an electric speed control device for motor vehicles, an internal combustion engine, a generator driven by the engine, an ignition system including ignition devices for the cylinders of the engine, an electric circuit arranged to divert the flow of current to certain of the ignition devices, a relay interposed in the circuit including electromagnets, a pivoted armature, means actuated by the armature for closing the circuit when the armature is in engagement with the electromagnets, means for energizing the electromagnets from the generator, a tension spring having one end secured to the armature, a rotatable shaft, means connecting the opposite end of the tension spring to the shaft, a dial plate, an indicator carried by the shaft arranged to cooperate with the dial plate, means for locking the shaft in any certain position, a normally open switch in the circuit, a gear shift lever, and means for closing the normally open switch by the gear shift lever, when the gear shift lever is in high speed position.

11. In an electric speed control device for motor vehicles, an internal combustion engine, a generator operatively connected with the engine, an ignition system including ignition devices for the cylinders of the engines, an electric circuit arranged to divert the flow of current from certain of the ignition devices, a relay interposed in the circuit including electromagnets and a hinged armature, means actuated by the armature for closing the circuit when the armature is in engagement with the electromagnets, means for energizing the electromagnets from the generator, and means for permitting the armature to be actuated by the magnets when the output of the generator exceeds a predetermined value.

12. In an electric speed control device for motor vehicles, an internal combustion engine, a generator operatively connected with the engine, ignition devices for the cylinders of the engines, a normally open electric circuit arranged to divert the flow of current from certain of the ignition devices, a relay including electromagnets and a hinged armature, means operated by the armature for closing the circuit when the armature is in engagement with the electromagnets, means for energizing the electromagnets from the generator, a spring connected to the armature, means for varying the tension of the spring, a normally open switch in the circuit, a gear shift lever arranged to operate the switch in high speed position, a normally closed switch in the circuit, and a clutch pedal arranged to operate the switch to open the same when the clutch is in its inoperative position.

13. In a speed control device for vehicles, an internal combustion engine, a generator operatively connected with the internal combustion engine, ignition devices for the cylinders of the engine, a normally open circuit arranged to divert the flow of current from certain of the ignition devices, a relay including electromagnets and a hinged armature, means actuated by the armature for closing the circuit when the armature is in engagement with the electromagnets, means for energizing the electromagnets from the generator, a rotatable shaft, a tension spring having its terminals connected respectively to the armature and to the rotatable shaft, a dial, an indicator carried by the shaft and cooperating with the dial, the dial having a plurality of apertures therein, a sliding pin carried by the shaft, and locking means arranged to hold the pin in any one of said openings.

14. In an electric speed control device for motor vehicles, an internal combustion engine, a generator operatively connected with the internal combustion engine, ignition devices for the cylinders of the engine, a normally open circuit arranged to divert the flow of current from certain of the ignition devices when the circuit is closed, an instrument board, a casing secured to the instrument board, a relay arranged in the casing including electro magnets and a hinged armature, means actuated by the armature to close the circuit when the armature is in engagement with the electromagnets, means connecting the electromagnets with the generator for energizing the magnets, a normally open electric light indicating circuit, means actuated by the armature for closing the electric indicating light circuit when the armature is in engagement with the electromagnets, a normally open switch in the circuit, a gear shift lever adapted to actuate the switch when in high speed position, an arcuate dial plate secured to the dash board, a shaft arranged in concentric relation to the dial plate and rotatably carried by the casing, a tension spring having its terminals secured to the armature and to the rotatable shaft respectively, a plurality of equi-distantly spaced openings formed in the dial plate arranged to correspond with the indications on the dial plate, a sliding pin carried by the shaft arranged to engage in any one of the openings, and locking means for permitting the withdrawal of the pin from out of engagement with the openings to permit the shaft to be turned to any desired position, said locking means also permitting the pin to be placed in any one of said openings and held in any one of said openings against movement.

HENRY L. MASON.